Feb. 23, 1943. C. G. GOODRICH 2,311,982
CONVEYER WHEEL FOR PEANUT DIGGERS
Filed Aug. 8, 1940 2 Sheets-Sheet 1

Inventor
C. G. Goodrich,
By Horace C. Chandler
Attorney

Feb. 23, 1943.   C. G. GOODRICH   2,311,982
CONVEYER WHEEL FOR PEANUT DIGGERS
Filed Aug. 8, 1940    2 Sheets-Sheet 2
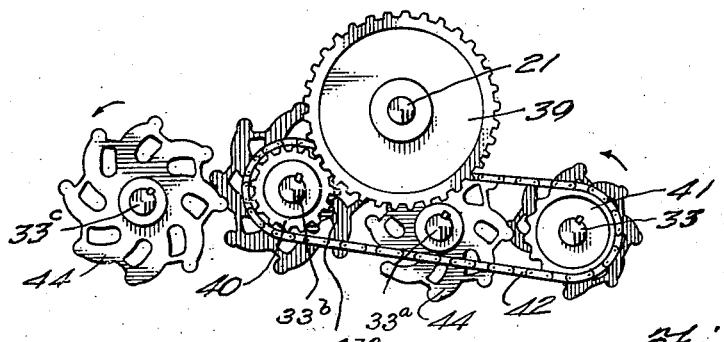
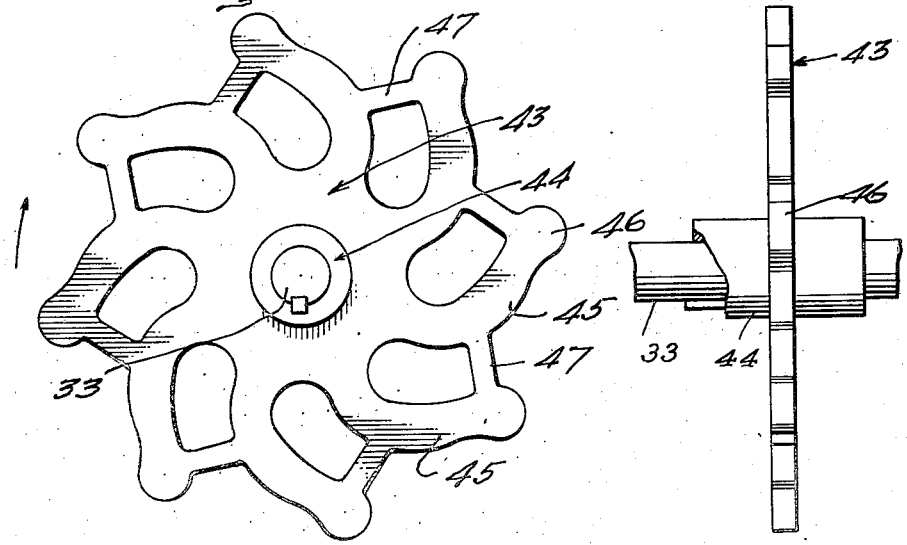
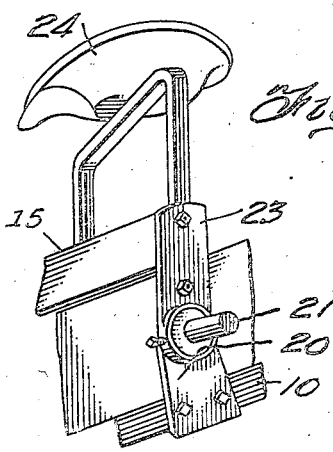
Inventor
C. G. Goodrich,
By Horace C. Chandler
Attorney Patented Feb. 23, 1943

2,311,982

UNITED STATES PATENT OFFICE 2,311,982

CONVEYER WHEEL FOR PEANUT DIGGERS

Cephus G. Goodrich, Wakefield, Va.

Application August 8, 1940, Serial No. 351,825

3 Claims. (Cl. 209—104)

This invention relates to new and useful improvements in peanut diggers and has special reference to the conveyer portion thereof which after the peanut vines have been dug from the ground conveys them with the peanuts to the rear of the machine, from which they are discharged.

One of the important objects of this invention is to provide a conveyer in such a digger, which during the conveyance of the vines with their attached peanuts to the rear of the digger will provide an improved means for tumbling the vines so as to shake the earth therefrom and discharge them at the rear in a clean condition so that they may be stacked or otherwise disposed of.

A second important object of the invention is to provide conveying mechanism for a peanut digger, wherein the vines will be conveyed to the rear of the machine by means of a series of especially designed conveyer wheels constructed to provide for the shaking of the vines during their rearward movement and thus freeing them of adhering earth.

A third important object of the invention is to provide a novel form of conveyer wheel for use in connection with peanut diggers of the present type.

A fourth important object of the invention is to provide novel means for regulating the depth of a plow implement arranged in front of the conveyer.

With the foregoing and other objects in view, the invention consists in general of novel details and combinations of parts hereinafter fully described, illustrated in the accompanying drawings, and specifically set forth in the claims.

Figure 1:
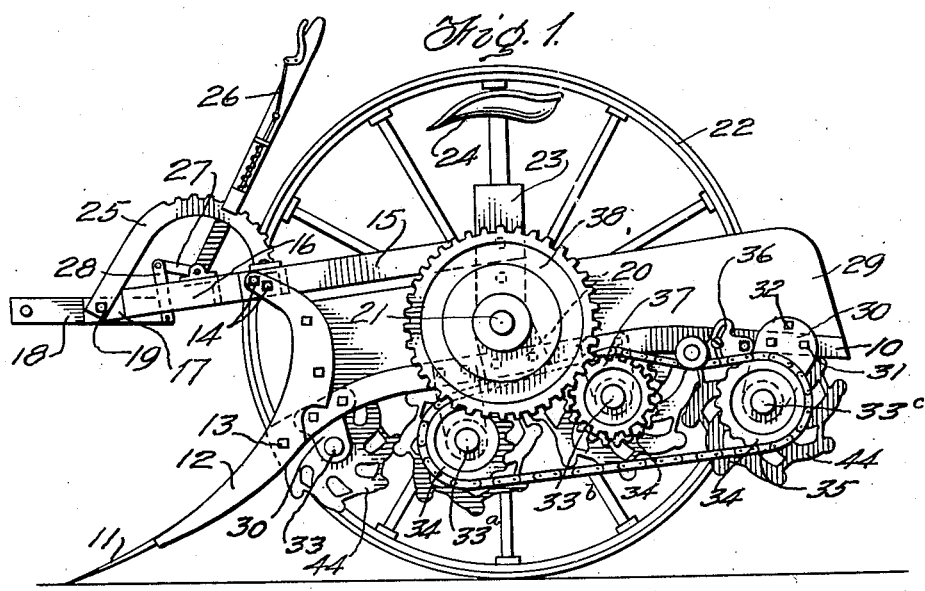
Figure 2:
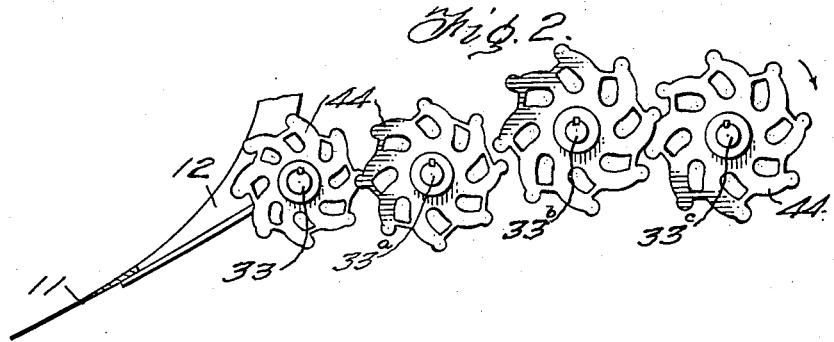
Figure 6:
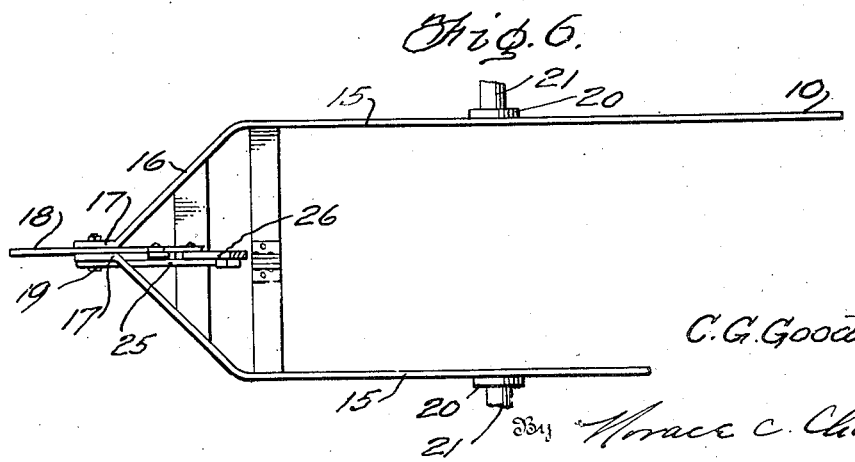

In the drawings, in which like reference numerals indicate like parts in the several views, Fig. 1 is a side elevation of the device with one of the ground wheels omitted to show the arrangement of the parts, Fig. 2 is a detail from the left side of the machine showing the longitudinal arrangement of the conveyer wheel, Fig. 3 is a view from the right side of the machine showing the manner in which the forward conveyer wheels are driven, Fig. 4 is an enlarged detail of one of the conveyer wheels employed herein, Fig. 5 is an edge view of the same showing the manner in which it is mounted on its shaft, Fig. 6 is a plan view of a portion of the machine showing means for regulating the longitudinal tilt thereof, and Fig. 7 is a view showing the manner of mounting the seat.

Referring to the drawings, the digger comprises a lower frame 10 to which is attached at its forward end a plow member 11 carried by a curved standard 12 which is connected by bolts 13 to the lower frame 10. The standard 12 projects upwardly beyond the frame 10 and is connected by bolts 14 to an upper frame 15 having forwardly converging sides 16. The sides 16 are provided with forwardly extending parallel parts 17 spaced to receive a clevis 18 which is pivoted to the parts 17 by a bolt or pin 19. The lower frame member 10 carries on each side an upwardly extending bracket 20 which supports a shaft 21 on each of which a ground wheel 22 is rotatably mounted. Also there is connected to the brackets 20 a seat frame 23 carrying a seat 24. The rear ends of the upper frame 15 are fixed to the seat frame 23. Thus in connection with the lower frame 10 and the upper frame 15 there is formed by the standard 12 and seat frame 23 a substantially rigid member which can, however, oscillate vertically due to the mounting of the shaft 21 within the wheels 22. As has been previously mentioned, the clevis 18 is pivoted to the upper frame member at 19. On this upper frame member there is secured a rack segment 25 and centrally of this segment there is pivoted to said frame member 15 a latch lever 26 for adjusting the depth of the plow member 11, which lever is held in adjusted position by the segment 25. The latch lever 26 has an arm 27 which is connected by a link 28 with the rear end of the clevis 18. Therefore, assuming that the clevis is attached to a tractor and is thereby held in a definite position above the ground, movement of the clevis by means of the lever 26 will raise or lower the forward end of the entire structure including the plow element. It is further to be noted that side boards 29 are mounted on the lower frame 10 so as to prevent dispersion of the vines laterally.

Secured to the lower frame 10 are pairs of brackets 30, the brackets of each pair being mounted on opposite sides of the frame in lateral alinement. These brackets are secured to the lower frame 10 by bolts 31, and their upper portions overlie and are secured to the side boards 29 by bolts 32 so that they serve to tie the side boards 29 to this lower frame. The brackets 30 constitute bearings for transverse conveyer shafts 33, 33a, 33b, and 33c on which are splined the conveyer wheels which constitute the principal part of this invention and which will be described in detail later herein. On the left end of each of the conveyer shafts 33a, 33b, and 33c, there is secured a sprocket 34 over which a sprocket chain 35 is trained. As shown in Fig. 1, the forward shaft 33 is not driven by the chain 35. On this side of the device there is a chain tightener 36 of the idle pulley type. Fixed on the left end of the shaft 33b, outwardly of its sprocket 34 is a gear 37 which meshes with a gear 38 fixed on the inner side of the left drive wheel 22 at its center. Because of this arrangement, the shafts 33a, 33b, and 33c are driven from the gear 37 as the machine moves over the ground.

On the opposite side of the machine, the ground wheel 22 carries a gear 39 which is mounted thereon in the same manner as the gear 38 is mounted. This gear 39 meshes with a gear 40 fixed on the outer end of the shaft 33b. On the right-hand end of the forward conveyer shaft 33 there is fixed a sprocket 41 which is connected by a chain 42 with a corresponding sprocket 41a on the corresponding end of the shaft 33b inwardly of the gear 40. Thus all of the conveyer shafts 33, 33a, 33b, and 33c are simultaneously driven in the same direction by the gears 38 and 39 fixed on the ground wheels 22, as the machine moves over the ground.

On each of the conveyer shafts, between the side members of the frame 10, is splined a series of conveyer wheels 43. The conveyer wheels of each series are off-set laterally with respect to the conveyer wheels of the next adjacent series and are of such diameter that the edges of each set of wheels overlap those of the next set, and yet these conveyer wheels are sufficiently closely spaced that when the assembly is completed they form in effect a corrugated conveyer which receives the material scooped up by the plow 11 and conveys it to the rear of the machine.

Now specifically describing the construction of the conveyer wheel 43, it will be seen from Figs. 4 and 5 that these wheels are thin relative to their diameters. Each of these wheels consists of a substantially cylindrical hub portion 44 from the longitudinal center of which extends a series of arcuate arms 45 spaced at equal circumferential distances about the hub 44, these arms being identically formed. The conveyer wheels are so placed on their shafts that they will rotate in such a direction as to engage, pick up, and convey rearwardly any material delivered thereto, either from the plow 11 or from forwardly adjacent wheels. For example, the conveyer wheels on the shaft 33 or front shaft receive the vines from the plow 11 as their arms 45 are ascending. The arms not only strike the vines with sufficient force to loosen and shake earth therefrom, but also convey them to the conveyer wheels of the shaft 33a, the arms of which are also ascending and therefore loosen and remove additional earth, after which the vines are conveyed to the wheels of each succeeding series where they are treated in a like manner until they are delivered from the rear of the machine free from earth or trash. Each of the arms 45 has its inner end portion curved in a direction opposite to that in which its attached wheel 43 rotates and has its outer end portion 46 curved to extend outwardly and substantially radially of said wheel as shown in Fig. 4. A bar 47 connects each arm to an adjacent arm. The portions 46 prevent the vines from slipping off the ends of the arms while the conveyer wheels are conveying them rearwardly. Because of the shape and construction of the conveyer wheels, the implement will not only convey the vines gathered by the plow 11 to the rear thereof, but will also agitate the same in such a manner as to shake therefrom all earth and undesired matter adhering thereto. Furthermore, the bars 47 will prevent the vines from being trapped between the arms 45 and thus interfering with the functioning of the conveyer.

In the foregoing, I have described one form of peanut digger embodying my invention. It is to be understood that various changes may be made in the construction of the machine without departing from the principle of my invention, and I therefore do not wish to restrict myself to the details of construction shown and described.

What is claimed, is:

1. A conveyer wheel for peanut diggers, comprising a rotatable hub, a series of arms spaced circumferentially about the hub, each of said arms being curved so that the outer portion thereof extends in a direction generally parallel to the adjacent tangent to the hub, and cross bars bridging the space between said arms adjacent their ends forming a recess having a relatively short side and a relatively long side.

2. A conveyer wheel for peanut diggers, comprising a rotatable hub, a series of arms spaced circumferentially about the hub, each of said arms being curved so that the outer portion thereof extends in a direction generally parallel to the adjacent tangent to the hub, cross bars bridging the space between said arms adjacent the ends thereof forming a recess having a relatively short side and a relatively long side, the long side of the recess having a rounded protuberance at its end.

3. A conveyer wheel for peanut diggers comprising a rotatable hub, a series of arms spaced circumferentially about the hub, each of said arms being curved so that the outer portion thereof extends in a direction generally parallel to the adjacent tangent to the hub, and rounded protuberances extending laterally from the convex edge of said arms at their extremities.

CEPHUS G. GOODRICH.